US012300857B2

(12) United States Patent
Li et al.

(10) Patent No.: US 12,300,857 B2
(45) Date of Patent: May 13, 2025

(54) SIGNAL TRANSMISSION TERMINAL, SAMPLING DEVICE, BATTERY MODULE AND DEVICE

(71) Applicant: CONTEMPORARY AMPEREX TECHNOLOGY (HONG KONG) LIMITED, Hong Kong (CN)

(72) Inventors: Long Li, Fujian (CN); Chong Wang, Fujian (CN); Wencai Xu, Fujian (CN); Xingyuan Wu, Fujian (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 393 days.

(21) Appl. No.: 17/721,564

(22) Filed: Apr. 15, 2022

(65) Prior Publication Data

US 2022/0238968 A1 Jul. 28, 2022

Related U.S. Application Data

(63) Continuation of application No. PCT/CN2021/087547, filed on Apr. 15, 2021.

(30) Foreign Application Priority Data

May 26, 2020 (CN) .......................... 202020912296.5

(51) Int. Cl.
*H01M 50/569* (2021.01)
*H01M 10/48* (2006.01)
(Continued)

(52) U.S. Cl.
CPC ......... *H01M 50/569* (2021.01); *H01M 10/48* (2013.01); *H01M 10/486* (2013.01);
(Continued)

(58) Field of Classification Search
CPC .. H01M 50/569; H01M 10/48; H01M 10/486; H01R 4/16; H01R 11/01;
(Continued)

(56) References Cited

U.S. PATENT DOCUMENTS 5,137,468 A * 8/1992 Murakami ........... H01R 4/2495
439/422
6,450,831 B2 * 9/2002 Aoyama ................ H01R 4/185
439/867
(Continued)

FOREIGN PATENT DOCUMENTS

CN 102544616 A * 7/2012 ........ H01M 10/4257
CN 203166126 U 8/2013
(Continued)

OTHER PUBLICATIONS

International Search Report dated Jun. 24, 2021 issued in PCT/CN2021/087547.
(Continued)

*Primary Examiner* — Peter G Leigh
(74) *Attorney, Agent, or Firm* — Scully, Scott, Murphy & Presser, P.C.

(57) ABSTRACT

A signal transmission terminal, a sampling device, a battery module and a device are disclosed. The signal transmission terminal is used for the sampling device. The sampling device includes a conductive sheet. The signal transmission terminal includes a first connecting portion, a second connecting portion and a bendable portion. The first connecting portion is used for being connected to the conductive sheet and is provided with a raised portion. The second connecting portion is connected to the first connecting portion and is used for being connected to a sampling object. The bendable portion is used for being connected to the first connecting portion. The bendable portion is configured to press the conductive sheet between the first connecting portion and
(Continued)

the bendable portion after being bent. The above signal transmission terminal can improve connection stability with the conductive sheet, such that reliability of sampling precision can be guaranteed.

18 Claims, 4 Drawing Sheets

(51) Int. Cl.
  *H01R 4/16* (2006.01)
  *H01R 11/01* (2006.01)
  *H01R 11/28* (2006.01)
  *H01R 43/16* (2006.01)
  *H02J 7/00* (2006.01)
(52) U.S. Cl.
  CPC ............ *H01R 4/16* (2013.01); *H01R 11/01* (2013.01); *H01R 11/288* (2013.01); *H01R 43/16* (2013.01); *H02J 7/0013* (2013.01); *H02J 7/0063* (2013.01)
(58) Field of Classification Search
  CPC ..... H01R 11/288; H01R 43/16; H02J 7/0013; H02J 7/0063
  USPC .......................................................... 439/34
  See application file for complete search history.

(56) References Cited

U.S. PATENT DOCUMENTS

| | | | | |
|---|---|---|---|---|
| 6,565,376 | B2 * | 5/2003 | Aoki | H01R 12/68 439/442 |
| 6,572,398 | B2 * | 6/2003 | Onuma | H01R 12/68 439/422 |
| 7,316,581 | B2 * | 1/2008 | Kumakura | H01R 4/182 439/877 |
| 9,431,720 | B2 * | 8/2016 | Ito | H01R 43/048 |
| 10,784,635 | B2 | 9/2020 | Peng et al. | |
| 2017/0025661 | A1 | 1/2017 | Gibeau et al. | |
| 2019/0356095 | A1 | 11/2019 | Peng et al. | |
| 2020/0358146 | A1 | 11/2020 | Ahn et al. | |
| 2021/0203012 | A1 | 7/2021 | Chen et al. | |

FOREIGN PATENT DOCUMENTS

| | | | | |
|---|---|---|---|---|
| CN | 207426196 U | * | 5/2018 | ............ H01R 12/68 |
| CN | 207818728 U | * | 9/2018 | ............ Y02E 60/10 |
| CN | 208225967 U | | 12/2018 | |
| CN | 109428183 A | | 3/2019 | |
| CN | 110224242 A | | 9/2019 | |
| CN | 209730082 U | | 12/2019 | |
| CN | 210467964 U | | 5/2020 | |
| CN | 210579431 U | * | 5/2020 | ............... H05K 1/02 |
| CN | 212161961 U | | 12/2020 | |
| DE | 2500556 A1 | * | 7/1975 | .......... H01R 4/2495 |
| DE | 3127704 A1 | * | 5/1982 | .......... H01R 4/2495 |
| DE | 20106497 U1 | | 7/2001 | |
| DE | 10305356 A1 | * | 10/2003 | ............ H01R 12/68 |
| DE | 10320536 B4 | * | 3/2008 | ............ H01R 12/68 |
| DE | 102016113105 A1 | * | 1/2017 | ............ B60L 50/15 |
| EP | 1 126 553 A2 | | 8/2001 | |
| EP | 1 126 553 A3 | | 6/2002 | |
| EP | 1083633 B1 | * | 7/2003 | ............ H01R 12/68 |
| JP | H048372 A | | 1/1992 | |
| JP | 2003022858 A | | 1/2003 | |
| JP | 2016076387 A | | 5/2016 | |
| KR | 20190085343 A | | 7/2019 | |
| KR | 20190092065 A | | 8/2019 | |
| WO | WO-02084805 A1 | * | 10/2002 | ............ H01R 12/68 |
| WO | WO-2012075948 A1 | * | 6/2012 | ........ H01M 10/4257 |
| WO | 2019139235 A1 | | 7/2019 | |

OTHER PUBLICATIONS

Decision to Grant a Patent dated Feb. 5, 2024 received in Japanese Patent Application No. JP 2022-542429.
Notice of Preliminary Rejection dated Mar. 8, 2024 received in Korean Patent Application No. KR 10-2022-7022933.
Notice of Reasons for Refusal dated Aug. 21, 2023 received in Japanese Patent Application No. JP 2022-542429.
International Search Report and Written Opinion dated Jun. 24, 2021 received in International Application No. PCT/CN2021/087547.
Extended European Search Report dated Nov. 8, 2022 received in European Patent Application No. EP 21813438.5.
Office Action dated Oct. 24, 2024 received in European Patent Application No. 21 813 438.5.

* cited by examiner

SIGNAL TRANSMISSION TERMINAL, SAMPLING DEVICE, BATTERY MODULE AND DEVICE

CROSS REFERENCE TO RELATED APPLICATION

This application is a continuation of International Application No. PCT/CN2021/087547, filed on Apr. 15, 2021, which claims priority to Chinese Patent Application No. 202020912296.5, filed on May 26, 2020. The disclosures of the aforementioned applications are hereby incorporated by reference in their entireties.

TECHNICAL FIELD

The application relates to the technical field of batteries, and particularly relates to a signal transmission terminal, a sampling device, a battery module and a device.

BACKGROUND ART

The advancement of science and technology broadens use of battery modules to more extensive fields, such as new energy vehicles, spacecrafts, aircrafts, ships, mobile computing equipment or electric tools. The battery module includes a plurality of secondary batteries and a bus component, where the plurality of different secondary batteries are connected in series or in parallel with each other through the bus component. In order to ensure the normal and safe work of the secondary battery, it is necessary to use a sampling device to monitor the working state of the secondary battery.

The sampling device includes a sampling circuit board and a signal transmission terminal, where the sampling circuit board is provided with a conductive sheet, and the signal transmission terminal is used for being connected to the bus component and the conductive sheet.

However, in the prior art, after the conductive sheet is connected to the signal transmission terminal, the sampling precision of the conductive sheet and the signal transmission terminal is poor, which affects the use safety of the secondary battery.

SUMMARY OF THE INVENTION

The application provides a signal transmission terminal, a sampling device, a battery module and a device. Connection stability between the signal transmission terminal and the conductive sheet may be improved, such that reliability of sampling precision may be guaranteed.

In one aspect, the application provides the signal transmission terminal for the sampling device including the conductive sheet. The signal transmission terminal includes:

a first connecting portion, a second connecting portion and a bendable portion. The first connecting portion is used for being connected to the conductive sheet and is provided with a raised portion. The second connecting portion is connected to the first connecting portion and is used for being connected to a sampling object. The bendable portion is used for being connected to the first connecting portion and is configured to press the conductive sheet between the first connecting portion and the bendable portion after being bent. The raised portion is positioned on one side of the bendable portion, and the bendable portion may be bent towards the raised portion, to clamp, along with the raised portion, the conductive sheet.

The signal transmission terminal according to the embodiment of the application includes the first connecting portion, the second connecting portion, and the bendable portion. is provided with a raised portion. The signal transmission terminal may pierce the conductive sheet, and the bendable portion and the raised portion may press the conductive sheet by bending the bendable portion, so as to directly connect the signal transmission terminal to the conductive sheet. In this way, a process of connecting the signal transmission terminal to the conductive sheet is simple and easy to operate, a reliable and stable connection between the signal transmission terminal and the conductive sheet may be guaranteed, and the signal transmission terminal and the conductive sheet are unlikely to be loosened and separated, such that reliability and stability of sampling precision are guaranteed, and use safety of the battery module is improved.

According to one embodiment of the application, the raised portion is provided with a recessed portion, and after the bendable portion is bent, a top portion of the bendable portion and the recessed portion are correspondingly arranged.

According to one embodiment of the application, at least part of the top portion is positioned within the recessed portion, and/or a top surface of the raised portion and a bottom surface of the recessed portion are both cambered surfaces.

According to one embodiment of the application, the number and positions of the recessed portions arranged on the raised portion are in one-to-one correspondence to the total number and positions of two rows of bendable portions.

According to one embodiment of the application, a width of a root portion of the bendable portion is larger than that of the top portion of the bendable portion, and the top portion of the bendable portion is cambered.

According to one embodiment of the application, the two rows of bendable portions are arranged on the first connecting portion at an interval, one row of bendable portions and the other row of bendable portions are arranged in a staggered manner, and the raised portion is positioned between the two rows of bendable portions.

According to one embodiment of the application, the first connecting portion includes two or more support legs, the bendable portion is connected to the support leg, and the raised portion is arranged on the support leg.

According to one embodiment of the application, a width of the first connecting portion is smaller than that of the second connecting portion.

According to one embodiment of the application, an elastic deformation capacity of the first connecting portion is stronger than that of the second connecting portion.

According to one embodiment of the application, the signal transmission terminal further includes a mounting positioning portion which is connected to one end, away from the second connecting portion, of the first connecting portion and is used for pre-positioning the signal transmission terminal when the signal transmission terminal is connected to the conductive sheet.

According to one embodiment of the application, the mounting positioning portion is provided with a sheet-shaped body and a positioning hole provided in the sheet-shaped body.

According to one embodiment of the application, the first connecting portion, the second connecting portion and the bendable portion are of an integrally formed structure.

In another aspect, the application provides a sampling device for a battery module. The sampling device includes a conductive sheet and the above signal transmission terminal. The conductive sheet is provided with an electric connection region, the bendable portion of the signal transmission terminal passes through the electric connection region, the bendable portion is bent, to press, along with the first connecting portion, the conductive sheet, such that the conductive sheet is connected to the signal transmission terminal.

According to one embodiment of the application, the sampling device further includes an upper insulating film and a lower insulating film which are arranged on two opposite sides of the conductive sheet respectively, and the electric connection region is not covered with the lower insulating film and/or the upper insulating film.

According to one embodiment of the application, the conductive sheet is provided with a through hole, and the bendable portion passes through the through hole.

According to one embodiment of the application, the conductive sheet is of a multi-layer structure, and/or the conductive sheet may be made of copper or a copper alloy.

In another aspect, the application provides a battery module including two or more secondary batteries and the above sampling device. The second connecting portion of the signal transmission terminal is connected to the secondary battery so as to collect a voltage or temperature signal of the secondary battery.

In another aspect, the application provides a device using a battery module as a power source. The device includes the above battery module for supplying electric energy to the device.

BRIEF DESCRIPTION OF THE DRAWINGS

In order to describe the technical solutions in the embodiments of the application more clearly, the accompanying drawings required for describing the embodiments are briefly described below. Obviously, the accompanying drawings in the following description show merely some embodiments of the present disclosure, and a person of ordinary skill in the art would also be able to derive other accompanying drawings from these accompanying drawings without creative efforts.

Figure 1:
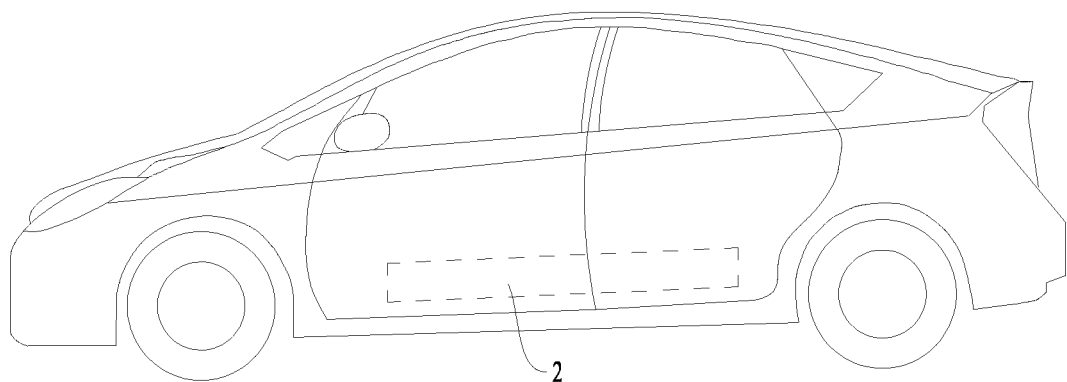
FIG. 1 is a structural schematic diagram of a vehicle disclosed in one embodiment of the application.

In the drawings, the components are not drawn to actual scale.

Description of numerals: 1. vehicle; 2. battery module; 21. secondary battery; 22. bus component; 23. sampling device; 3. signal transmission terminal; 31. first connecting portion; 31*a*. support leg; 311. raised portion; 3111. recessed portion; 32. second connecting portion; 33. bendable portion; 331. top portion; 332. root portion; 34. mounting positioning portion; 4. conductive sheet; 41. electric connection region; 5. upper insulating film; 6. lower insulating film; 7. connection port; X. width direction.

Specific Embodiments

The implementation of the application will be further described in detail with reference to the accompanying drawings and the embodiments. The following detailed description of the embodiments and the accompanying drawings serve to illustrate principles of the application as examples, but are not intended to limit the scope of the application, that is, the application is not limited to the described embodiments.

In the description of the application, the following is to be noted: unless otherwise specified, "plurality" means two or more; the terms "upper", "lower", "left", "right", "inner", "outer", etc. indicate azimuthal or positional relations only for ease of description of the application and for simplicity of description, and are not intended to indicate or imply that the referenced device or element must have a particular orientation and be constructed and operative in a particular orientation, and thus may not be construed as a limitation on the application. Moreover, the terms "first", "second", "third", etc. are merely for descriptions and may not be understood as indication or implication of relative importance. "Perpendicular" is not perpendicular in a strict sense, but within error allowance. "Parallel" is not parallel in a strict sense, but within error allowance.

Nouns of locality appearing in the following description are orientation shown in the drawings and are not intended to limit the specific structure of the application. In the description of the application, it is also noted that unless expressly specified otherwise, the terms "mount", "connect", "connected", etc. are to be construed broadly and, for example, may be fixedly connected, or detachably connected, or integrally connected, and may be direct connected or indirect connected via an intermediary medium. The specific meanings of the above terms in the application may be understood on a case-by-case basis for those with ordinary skills in the art.

In order to solve the problem that sampling precision of a conductive sheet in a battery module and a signal transmission terminal is poor in the prior art, the applicant optimizes a process of connecting the conductive sheet to the signal transmission terminal. The applicant connects the conductive sheet to the signal transmission terminal through a braze welding, riveting or gluing process. However, the sampling precision is still poor during use. Therefore, the applicant further studies and analyzes the process of connecting the conductive sheet to the signal transmission terminal, and finds that when the braze welding process is used, an electronic component will be damaged by a high-temperature environment during braze welding. When the riveting process is used, a joint between the conductive sheet and the signal transmission terminal may loosen. When the gluing process is used, glue permeates between the conductive sheet and the signal transmission terminal, such that a connection resistance between the conductive sheet and the signal transmission terminal becomes large. In this way, after the conductive sheet and the signal transmission terminal are connected through the above connecting process, the problem of poor sampling precision is prone to occur, and use safety of a secondary battery is affected.

In view of the above problems found by the applicant, the applicant improves a structure of the battery module, and the embodiments of the application will be further described below.

In order to better understanding the application, the application will be described below with reference to FIG. 1 to FIG. 8.

With reference to FIG. 1, the embodiment of the application provides a device using the battery module 2 as a power source. The device may be, but is not limited to, a vehicle, a ship, an aircraft, a power tool, etc. One embodiment of the application provides a vehicle 1 including a vehicle body and the battery module 2. The vehicle 1 may be a pure electric vehicle or a hybrid vehicle or an extended-range vehicle. The vehicle body is provided with a driving motor electrically connected to the battery module 2. The battery module 2 supplies electric energy to the driving motor. The electric drive motor is connected to a wheel on the vehicle body by means of a transmission mechanism so as to drive the vehicle to move. Optionally, the battery module 2 may be horizontally arranged at a bottom portion of the vehicle body.

Figure 2:
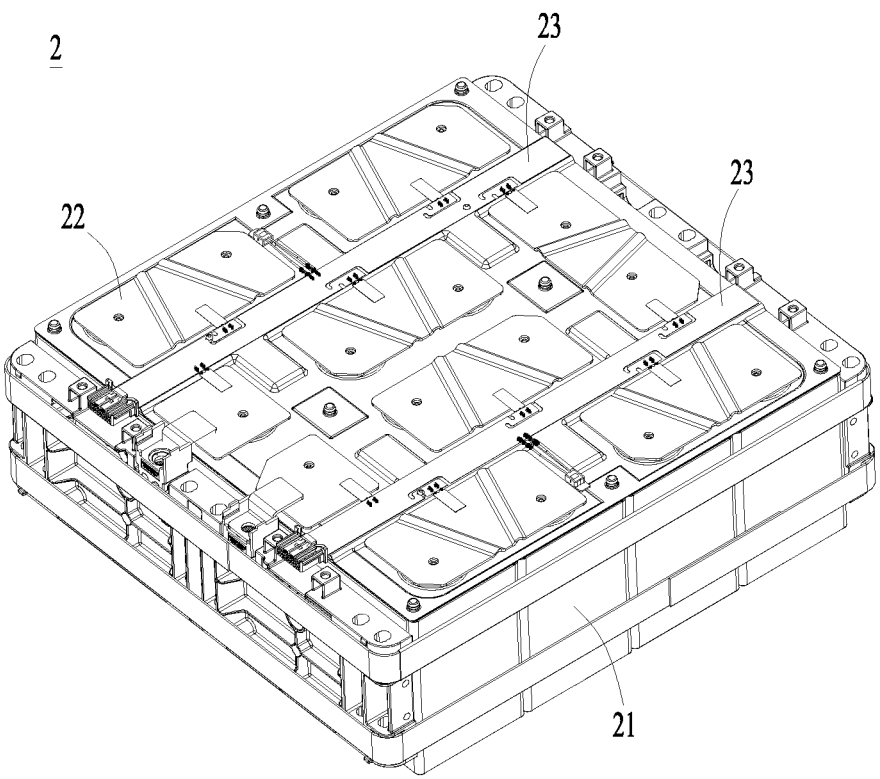
FIG. 2 is a structural schematic diagram of a battery module disclosed in one embodiment of the application.

With reference to FIG. 2, the battery module 2 includes two or more secondary batteries 21, a bus component 22 and a sampling device 23. The bus component 22 is used to connect the different secondary batteries 21 in series or in parallel. The secondary battery 21 is taken as a sampling object. The sampling device 23 is used for being connected to the bus component 22 so as to collect a voltage or temperature signal of the secondary battery 21. The battery module 2 may be arranged in various manners. In one embodiment, the battery module 2 includes an accommodation component and the two or more secondary batteries 21 positioned in the accommodation component. The two or more secondary batteries 21 are arranged side by side in the accommodation component. The accommodation component may be arranged in various manners, for example, the accommodation component includes a shell and a cover plate covering the shell; or the accommodation component includes a side plate and an end plate which are sequentially connected in an enclosing manner; or the accommodation component includes two end plates oppositely arranged and a strap surrounding the end plates and the secondary battery 21.

Figure 3:
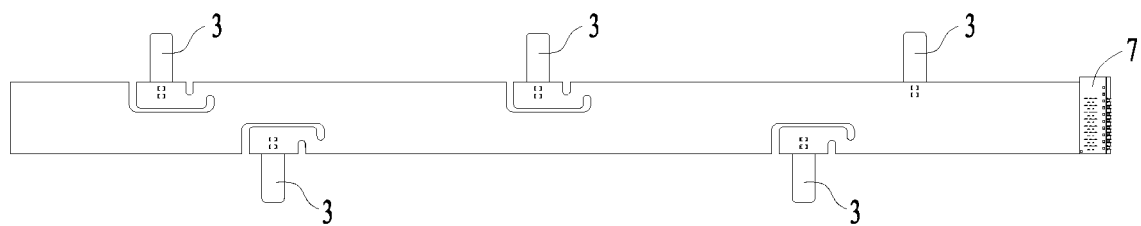
FIG. 3 is a structural schematic diagram of a sampling device disclosed in one embodiment of the application.
Figure 4:
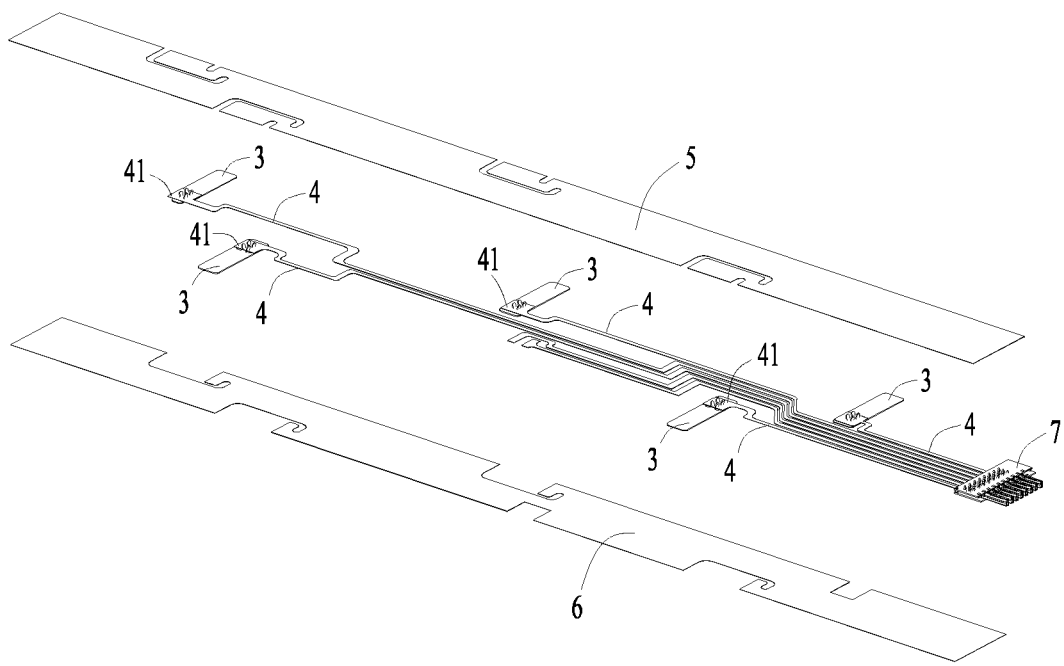
FIG. 4 is a schematic diagram of an exploded structure of the sampling device of the embodiment shown in FIG. 3.

In one embodiment, with reference to FIG. 2 to FIG. 4, the sampling device 23 includes a signal transmission terminal 3, a conductive sheet 4, an upper insulating film 5, a lower insulating film 6 and a connection port 7. The connection port 7 is used for being connected to a central controller (not shown in the Figures). The upper insulating film 5, the conductive sheet 4, and the lower insulating film 6 are arranged in a stacked manner. The signal transmission terminal 3 is connected to the connection port 7 by means of the conductive sheet 4. The sampling device 23 is connected to the bus component 22 by means of the signal transmission terminal 3. The number of the signal transmission terminals 3 is in one-to-one correspondence to the number of the bus components 22. In one example, the signal transmission terminal 3 is connected to the bus component 22 in a welded manner. Optionally, the conductive sheet 4 is of a multi-layer structure, namely, is formed by stacking two or more layer structures. The conductive sheet 4 may be made of copper or a copper alloy, etc. The conductive sheet 4 may be formed by stacking a plurality of layers of foils made of copper or a copper alloy. Optionally, the signal transmission terminal 3 may be directly connected to the secondary battery 21.

Figure 5:
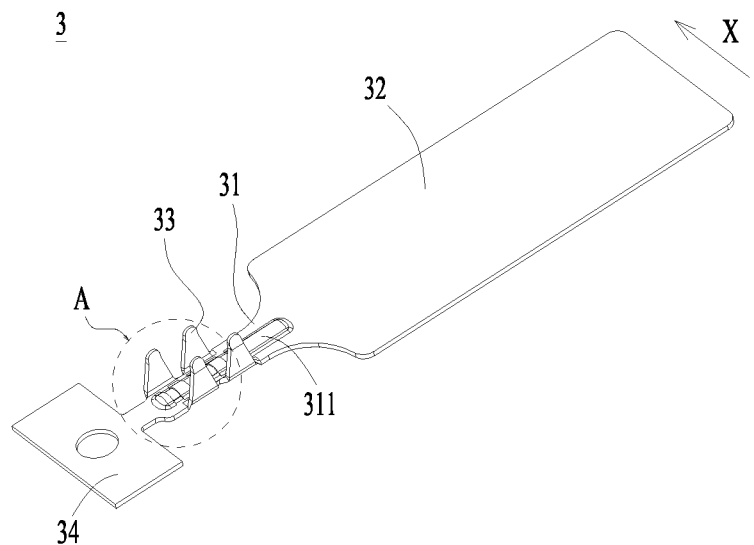
FIG. 5 is a structural schematic diagram of a signal transmission terminal disclosed in one embodiment of the application.

In one embodiment, with reference to FIG. 5, the signal transmission terminal 3 includes a first connecting portion 31, a second connecting portion 32 and a bendable portion 33. The first connecting portion 31 is used for being connected to the conductive sheet 4 and is provided with a raised portion 311. The second connecting portion 32 is connected to the first connecting portion 31 and is used for being connected to the bus component 22. The bendable portion 33 is used for being connected to the first connecting portion 31 and is configured to press the conductive sheet 4 between the first connecting portion 31 and the bendable portion 33 after being bent. The raised portion 311 is positioned on one side of the bendable portion 33. The raised portion 311 and the bendable portion 33 are arranged at an interval in a width direction X, the bendable portion 33 may be bent towards the raised portion 311, to clamp, along with the raised portion 311, the conductive sheet 4. In one example, when the signal transmission terminal 3 and the conductive sheet 4 are connected, the bendable portion 33 pierces the conductive sheet 4 in advance and then is bent; or the conductive sheet 4 is provided with a through hole in advance, and the bendable portion 33 passes through the through hole and then is bent. In one example, the first connecting portion 31, the second connecting portion 32 and the bendable portion 33 are of an integrally formed structure.

The signal transmission terminal 3 of the embodiment of the application includes the first connecting portion 31, the second connecting portion 32 and the bendable portion 33. The first connecting portion 31 is provided with the raised portion 311. After the bendable portion 33 passes through the conductive sheet 4, the bendable portion 33 may be bent towards the raised portion 311. After the bendable portion 33 is bent, the bendable portion 33 and the raised portion 311 may clamp the conductive sheet 4, so as to improve connection stability between the conductive sheet 4 and the signal transmission terminal 3, and reduce possibility of looseness between the conductive sheet 4 and the signal transmission terminal 3. The raised portion 311 of the first connecting portion 31 may provide support for the bendable portion 33. If the first connecting portion 31 is not provided with the raised portion 311, there may be a gap between the bent bendable portion 33 and the first connecting portion 31, such that the bendable portion 33 and the first connecting portion 31 may not effectively press the conductive sheet 4, and the conductive sheet 4 may loosen. When the bendable portion 33 is bent and presses the conductive sheet 4, the raised portion 311 of the first connecting portion 31 may press against the conductive sheet 4 so as to limit the conductive sheet 4, so as to reduce possibility that the bendable portion 33 applies a friction force to the conductive sheet 4 when bent so as to pull the conductive sheet 4, then the conductive sheet 4 shifts, and a positioning deviation is large. In this way, the signal transmission terminal 3 may be directly connected and fixed to the conductive sheet 4 by means of the bendable portion 33, the bendable portion 33 and the first connecting portion 31 may effectively press the conductive sheet 4, and the connection stability between the signal transmission terminal 3 and the conductive sheet 4 may also be guaranteed without the welding, riveting, gluing or other connection processes. Thus, the process of connecting the bendable portion 33 and the conductive sheet 4 is simple and convenient, reliability and stability of sampling precision are guaranteed, and use safety of the battery module 2 is improved.

Figure 6:
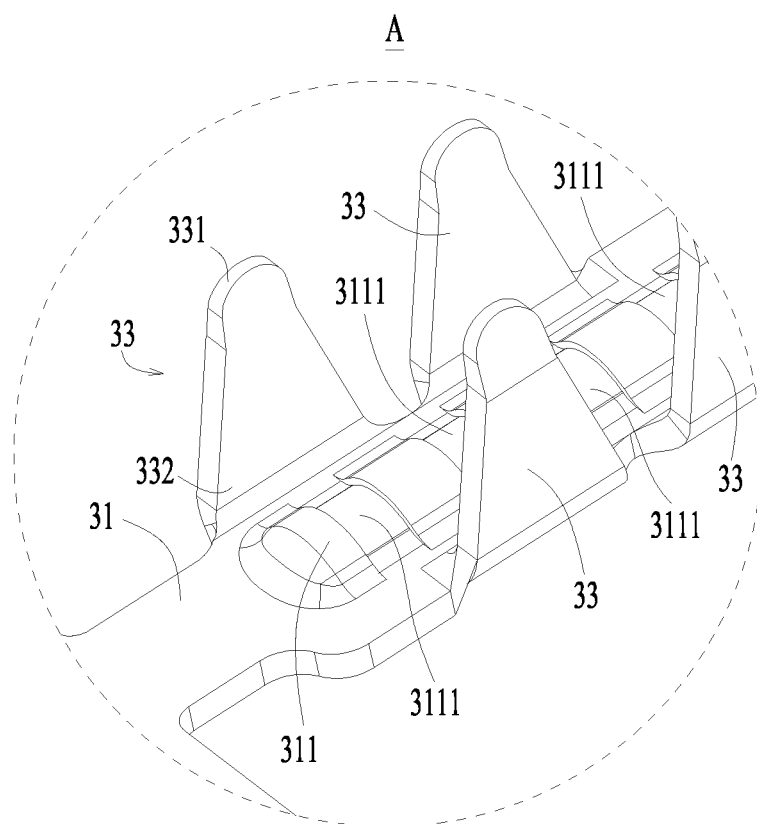
FIG. 6 is an enlarged view of A in FIG. 5.
Figure 7:
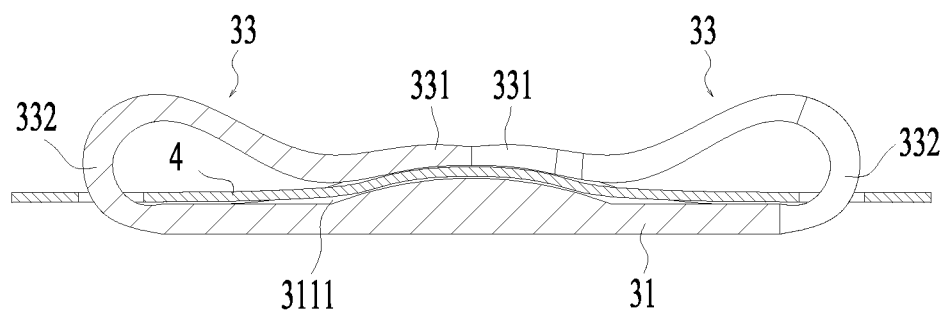
FIG. 7 is a schematic diagram of a partial sectional structure of the signal transmission terminal and a conductive sheet disclosed in one embodiment of the application.

In one embodiment, with reference to FIG. 6 and FIG. 7, the raised portion 311 is provided with a recessed portion 3111. The bendable portion 33 is provided with a top portion 331 and a root portion 332 which are oppositely arranged. The root portion 332 of the bendable portion 33 is used for being connected to the first connecting portion 31. After the bendable portion 33 is bent, the top portion 331 of the bendable portion 33 corresponds to the recessed portion 3111, such that a portion, corresponding to the recessed portion 3111, of the conductive sheet 4 may be pressed into the recessed portion 3111. In this way, the conductive sheet 4 pressed by the bendable portion 33 is further limited by the raised portion 311, such that the reliability and stability of connection between the conductive sheet 4 and the signal transmission terminal 3 are improved, and the conductive sheet 4 is unlikely to move relative to the raised portion 311 and the bendable portion 33 when subjected to an external force. In one example, at least part of the top portion 331 of the bent bendable portion 33 is positioned within the recessed portion 3111. The top portion 331 of the bendable portion 33 may press a region, corresponding to the recessed portion 3111, of the conductive sheet 4 into a deeper position of the recessed portion 3111, and a side wall of the recessed portion 3111 may limit the top portion 331 of the bendable portion 33. In this way, when the conductive sheet 4 or the signal transmission terminal 3 is subjected to an external force, the conductive sheet 4 is unlikely to move relative to the raised portion 311 and the bendable portion 33, which is conductive to further improving the connection reliability and stability between the conductive sheet 4 and the signal transmission terminal 3. In one example, a top surface of the raised portion 311 and a bottom surface of the recessed portion 3111 are both cambered surfaces, so as to reduce possibility that when the conductive sheet 4 is pressed by the bendable portion 33, stress concentration occurs in regions, corresponding to the top surface and the bottom surface, of the conductive sheet 4, so as to cause structural damages such as cracking to the regions. In one example, a width of the root portion 332 of the bendable portion 33 is larger than that of the top portion 331 of the bendable portion 33, such that the bendable portion 33 is of a tapered or trapezoidal structure with a narrow upper portion and a wide lower portion. When the bendable portion 33 is used to directly pierce the conductive sheet 4, the bendable portion 33 may easily pierce the conductive sheet 4, and a pierced area of the pierced conductive sheet 4 may be easily controlled. The top portion 331 of the bendable portion 33 is cambered, which is conductive to reducing possibility that after the bendable portion 33 is bent, a contact region between the top portion 331 and the conductive sheet 4 applies excessive compressive stress to the conductive sheet 4, so as to cause structural damages caused by local stress concentration to the conductive sheet 4, and is also conductive to reducing the possibility that the bendable portion 33 may stab an operator during use.

In one embodiment, with reference to FIG. 6, two rows of bendable portions 33 are arranged at the first connecting portion 31 at intervals. One row of bendable portions 33 and the other row of bendable portions 33 are arranged in a staggered manner, such that after being bent, all the bendable portions 33 do not interfere with each other in position. In one example, the two rows of bendable portions 33 are arranged in a width direction X at intervals. The raised portion 311 is positioned between the two rows of bendable portions 33. One or more bendable portions 33 are arranged in each row. The number and positions of the recessed portions 3111 arranged on the raised portion 311 are in one-to-one correspondence to the total number and positions of the two rows of bendable portions 33. After all the bendable portions 33 are bent, the conductive sheet 4 may be pressed at different positions, such that a contact area between the conductive sheet 4 and the raised portion 311 is increased, and the connection reliability and stability between the conductive sheet 4 and the signal transmission terminal 3 are improved. Meanwhile, all the bendable portions 33 are designed in a mutual redundant manner, when part of the bendable portions 33 is damaged, the remaining bendable portions 33 may still press the conductive sheet 4 so as to keep a connected state between the conductive sheet 4 and the signal transmission terminal 3. In addition, since the contact area between the top portion 331 of the bendable portion 33 and the conductive sheet 4 is small, if all the bendable portions 33 are not arranged in a staggered manner, after the two rows of bendable portions 33 are bent, the top portions 331 of the bendable portions 33 on two sides of the raised portion 311 may partially overlap, and overlapping portions may cause uncontrollable pressing force, such that the conductive sheet 4 may be prone to loosen.

Figure 8:
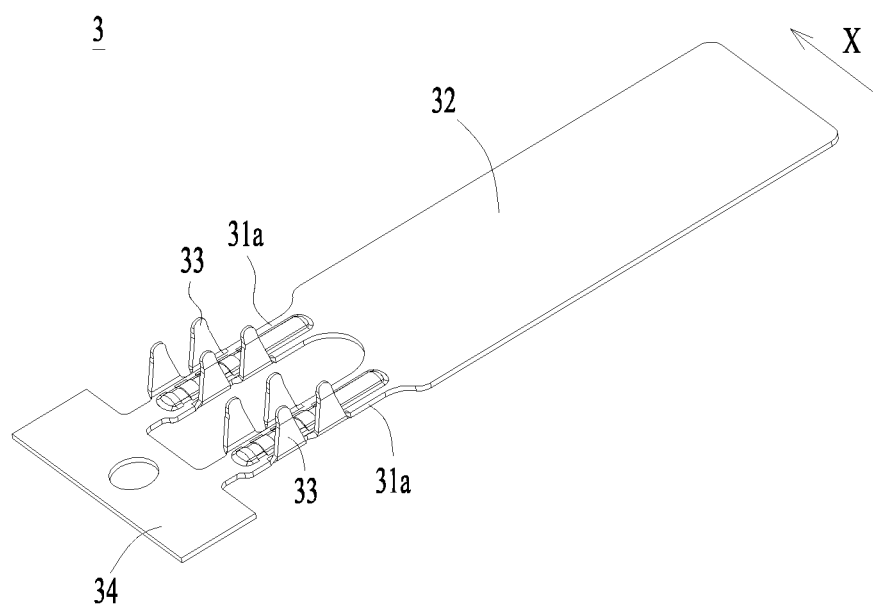
FIG. 8 is a structural schematic diagram of a signal transmission terminal disclosed in another embodiment of the application.

In one embodiment, with reference to FIG. 8, the first connecting portion 31 includes two support legs 31a arranged in the width direction X at an interval, a gap is formed between the two support legs 31a, the bendable portion 33 is connected to the support leg 31a, and the raised portion 311 is arranged on the support leg 31a. The two support legs 31a may be connected to the conductive sheet 4 by means of the bendable portions 33 on the support legs 31a, such that a pulling force after the signal transmission terminal 3 and the conductive sheet 4 are connected in a pressed manner is improved, and the possibility that the signal transmission terminal 3 and the conductive sheet 4 are prone to be separated from each other after subjected to the pulling force, and then the conductive sheet 4 is torn is reduced. Each support leg 31a is provided with the two rows of bendable portions 33, for each support leg 31a, one row of bendable portions 33 and the other row of bendable portions 33 are arranged in a staggered manner. Optionally, two or more support legs 31a are arranged.

In one embodiment, with reference to FIG. 5 or FIG. 8, the first connecting portion 31 and the second connecting portion 32 are both of sheet-shaped structures. A width of the first connecting portion 31 is smaller than that of the second connecting portion 32, such that an elastic deformation capacity of the first connecting portion 31 is stronger than that of the second connecting portion 32. In this way, when the second connecting portion 32 is subjected to an external force and is stretched in the width direction X or a thickness direction of the second connecting portion 32, the first connecting portion 31 may effectively buffer the external force, so as to reduce possibility that the conductive sheet 4 is torn due to an excessive deviation position of the first connecting portion 31 following the second connecting portion 32.

In one embodiment, with reference to FIG. 5 or FIG. 8, the signal transmission terminal 3 further includes a mounting positioning portion 34. The mounting positioning portion 34 is connected to one end, away from the second connecting portion 32, of the first connecting portion 31. The mounting positioning portion 34 is used for pre-positioning the signal transmission terminal 3 when the signal transmission terminal 3 and the conductive sheet 4 are connected, such that the bending equipment may accurately bend the bendable portion 33 and connect, in a pressing manner, the bendable portion 33 onto the raised portion 311 conveniently, and possibility that a connection position of the signal transmission terminal 3 and the conductive sheet 4 is not in a predetermined position due to a position deviation of the signal transmission terminal 3 is reduced. In one example, the mounting positioning portion 34 is provided with a sheet-shaped body and a positioning hole provided in the sheet-shaped body. The mounting positioning portion 34 is positioned in a positioning tool by means of the positioning hole.

In one embodiment, with reference to FIG. 4, the conductive sheet 4 is provided with an electric connection region 41. The conductive sheet 4 is of an elongated structure. A free end, away from the connection port 7, of the conductive sheet 4 forms the electric connection region 41. The bendable portion 33 passes through the electric connection region 41. In one example, the upper insulating film 5 covers the electric connection region 41. The bendable portion 33 may be bent after passing through the conductive sheet 4 and the upper insulating film 5 at the same time, or only passing through the conductive sheet 4, and the upper insulating film 5 covers, from an exterior of the bendable portion 33, a portion, passing through the conductive sheet 4, of the bendable portion 33 and the electric connection region 41 of the conductive sheet 4. In one example, the lower insulating film 6 covers the electric connection region 41. The bendable portion 33 may be bent after passing through the lower insulating film 6 and the conductive sheet 4 at the same time, or only passing through the conductive sheet 4, and the lower insulating film 6 covers, from an exterior of the first connecting portion 31, the first connecting portion 31 and the electric connection region 41 of the conductive sheet 4. In one example, the upper insulating film 5 and the lower insulating film 6 both cover the electric connection region 41. The bendable portion 33 may be bent after passing through the conductive sheet 4 and the upper insulating film 5 at the same time, and the lower insulating film 6 covers the first connecting portion 31; or the bendable portion 33 may be bent after passing through the lower insulating film 6 and the conductive sheet 4 at the same time, and the upper insulating film 5 covers a portion, passing through the conductive sheet 4, of the bendable portion 33.

The signal transmission terminal 3 of the embodiment of the application includes the first connecting portion 31, the second connecting portion 32 and the bendable portion 33. The first connecting portion 31 is provided with the raised portion 311. When the signal transmission terminal 3 is applied to the sampling device 23, the signal transmission terminal 3 may pierce the conductive sheet 4, and the bendable portion 33 and the raised portion 311 may press the conductive sheet 4 by bending the bendable portion 33, so as to directly connect the signal transmission terminal 3 to the conductive sheet 4. In this way, the process of connecting the signal transmission terminal 3 and the conductive sheet 4 is simple and easy to operate, the reliable and stable connection between the signal transmission terminal 3 and the conductive sheet 4 may be guaranteed, and the signal transmission terminal and the conductive sheet are unlikely to be loosened and separated, such that the reliability and stability of sampling precision are guaranteed, and the use safety of the battery module 2 is improved.

While the application has been described with reference to optimal embodiments, various modifications may be made thereto and equivalents may be substituted for components thereof without departing from the scope of the application. In particular, the various technical features mentioned in the various embodiments may be combined in any way as long as no structural conflict exists. The application is not limited to the particular embodiments disclosed herein, but includes all technical solutions falling within the scope of the claims.

What is claimed is:

1. A signal transmission terminal for a sampling device which comprises a conductive sheet, comprising:
   a first connecting portion for being connected to the conductive sheet and provided with a raised portion;
   a second connecting portion connected to the first connecting portion and used for being connected to a sampling object; and
   a bendable portion for being connected to the first connecting portion and configured to press the conductive sheet between the first connecting portion and the bendable portion after being bent, wherein the raised portion is positioned at one side of the bendable portion, the raised portion and the bendable portion are arranged in a width direction of the first connecting portion, and the bendable portion can be bent towards the raised portion, to clamp, along with the raised portion, the conductive sheet,
   wherein the first connecting portion comprises two or more support legs arranged in the width direction of the first connecting portion at an interval, each of the two or more support legs connected to the bendable portion, and provided with the raised portion;
   an elastic deformation capacity of the first connecting portion is stronger than that of the second connecting portion.

2. The signal transmission terminal according to claim 1, wherein the raised portion is provided with a recessed portion, and after the bendable portion is bent, a top portion of the bendable portion and the recessed portion are correspondingly arranged.

3. The signal transmission terminal according to claim 2, wherein at least part of the top portion is positioned within the recessed portion, and/or a top surface of the raised portion and a bottom surface of the recessed portion are both chamfered surfaces.

4. The signal transmission terminal according to claim 2, wherein the number and positions of the recessed portions arranged on the raised portion are in one-to-one correspondence to the total number and positions of the two rows of bendable portions.

5. The signal transmission terminal according to claim 2, wherein a width of a root portion of the bendable portion is larger than that of the top portion of the bendable portion, and the top portion of the bendable portion is chamfered.

6. The signal transmission terminal according to claim 2, wherein the two rows of bendable portions are arranged on the first connecting portion at an interval, one row of bendable portions and the other row of bendable portions are arranged in a staggered manner, and the raised portion is positioned between the two rows of bendable portions.

7. The signal transmission terminal according to claim 1, wherein the two rows of bendable portions are arranged on the first connecting portion at an interval, one row of bendable portions and the other row of bendable portions are arranged in a staggered manner, and the raised portion is positioned between the two rows of bendable portions.

8. The signal transmission terminal according to claim 1, wherein a width of the first connecting portion is smaller than that of the second connecting portion.

9. The signal transmission terminal according to claim 1, further comprising a mounting positioning portion which is connected to one end, away from the second connecting portion, of the first connecting portion and is used for pre-positioning the signal transmission terminal when the signal transmission terminal is connected to the conductive sheet.

10. The signal transmission terminal according to claim 9, wherein the mounting positioning portion is provided with a sheet-shaped body and a positioning hole provided in the sheet-shaped body.

11. The signal transmission terminal according to claim 1, wherein the first connecting portion, the second connecting portion and the bendable portion are of an integrally formed structure.

12. A sampling device for a battery module, comprising:
a conductive sheet provided with an electric connection region; and
the signal transmission terminal according to claim 1, wherein the bendable portion passes through the electric connection region, and the bendable portion is bent, to press, along with the first connecting portion, the conductive sheet, such that the conductive sheet is connected to the signal transmission terminal.

13. The sampling device according to claim 12, further comprising an upper insulating film and a lower insulating film which are arranged on two opposite sides of the conductive sheet respectively, and the electric connection region is not covered with the lower insulating film and/or the upper insulating film.

14. The sampling device according to claim 12, wherein the conductive sheet is provided with a through hole, and the bendable portion passes through the through hole.

15. The sampling device according to claim 12, wherein the conductive sheet is of a multi-layer structure, and/or the conductive sheet can be made of copper or a copper alloy.

16. The sampling device according to claim 12, wherein the raised portion is provided with a recessed portion, and after the bendable portion is bent, a top portion of the bendable portion and the recessed portion are correspondingly arranged.

17. A battery module, comprising:
two or more secondary batteries; and
the sampling device according to claim 12, wherein the second connecting portion of the signal transmission terminal is connected to the secondary battery so as to collect a voltage or temperature signal of the secondary battery.

18. A device using a battery module as a power source, comprising:
the battery module according to claim 17 for supplying electric energy to the device.

* * * * *